(12) United States Patent
O'Mahony et al.

(10) Patent No.: US 8,889,208 B2
(45) Date of Patent: Nov. 18, 2014

(54) PURIFICATION OF BETA CASEIN FROM MILK

(75) Inventors: James Anthony O'Mahony, Glenville (IE); Karen E. Smith, Madison, WI (US); John Anthony Lucey, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1238 days.

(21) Appl. No.: 11/272,331

(22) Filed: Nov. 9, 2005

(65) Prior Publication Data

US 2007/0104847 A1 May 10, 2007

(51) Int. Cl.
| | |
|---|---|
| *A23C 9/14* | (2006.01) |
| *A23J 1/20* | (2006.01) |
| *A23C 19/00* | (2006.01) |
| *A23C 9/142* | (2006.01) |

(52) U.S. Cl.
CPC .............. *A23J 1/202* (2013.01); *A23C 19/00* (2013.01); *A23C 9/1422* (2013.01); *A23V 2002/00* (2013.01)
USPC ............ 426/580; 426/490; 426/491; 426/657

(58) Field of Classification Search
USPC ......... 426/425, 431, 478, 490, 491, 495, 580, 426/582, 587, 656, 657
See application file for complete search history.

(56) References Cited

U.S. PATENT DOCUMENTS

| | | | |
|---|---|---|---|
| 5,169,666 | A | 12/1992 | Woychik |
| 6,485,762 | B1 | 11/2002 | Rizvi |
| 6,623,871 | B2 | 9/2003 | Planche |

FOREIGN PATENT DOCUMENTS

| | | |
|---|---|---|
| FR | 2592769 | 7/1987 |
| FR | 2671945 B1 | 4/1993 |
| WO | WO 92/12642 | 8/1992 |
| WO | WO 94/06306 | 3/1994 |

OTHER PUBLICATIONS

Famelart and Surel, "Caseinate at Low Temperatures: Calcium Use in β-Casein Extraction by Microfiltration," *Journal of Food Science*, 59(3):548-587 (1994).
Fauquant, et al., "Microfiltration of Milk Using a Mineral Membrane," *Technique Laitiere*, 1028:21-23 (1988).
Jost, et al., "Protein Composition of Micellar Casein Obtained by Cross-Flow Micro-filtration of Skimmed Milk," *International Daily*, 9:389-390 (1999).
Kelly, et al., "Implementation of Integrated Membrane Processes for Pilot Scale Development of Fractionated Milk Components," *Lait*, 80:139-153 (2000).
LeBerre, et al., "Fouling and Selectivity of Membranes During Separation of β-casein," *Journal of Membrane Science*, 88:263-270 (1994).
Murphy, et al. "Fractionation of Sodium Caseinate by Ultrafiltration," *Food Chemistry*, 39:27-38 (1991).
Pierre, et al., "Preparation de phosphocaseinate natif par microfiltration sur membrane," *Lait*, 72:461-474 (1992).
Ward and Bastian, "A Method for Isolating β-Casein," *J. Dairy Sci.*, 79:1332-1339 (1996).
Maubois, J.L., et al., "Milk Protein Fractionation," International Dairy Federation Special Issue, International Dairy Federation, BE, vol. 9201, pp. 15-22 (1992).
Examination Report for New Zealand patent application No. 568509, dated Apr. 9, 2010.
International Preliminary Report on Patentability from PCT/US2006/042021, dated May 14, 2008.
Summons to attend oral proceedings pursuant to Rule 115(1) EPC for Application No. 06826881.2, dated Mar. 27, 2013; 3 pages.
Canadian Office Action for Application No. 2,629,427 dated Aug. 16, 2012.
Examiner's Report in related European Application No. 2,629,427.
Morel, "Production de Caseine "Native" Pour La Premiere Fois A L'Echelle Industrielle," Process, 1058: 53-56 (1991).

*Primary Examiner* — Leslie Wong
(74) *Attorney, Agent, or Firm* — Armstrong Teasdale LLP

(57) ABSTRACT

A method is provided for obtaining β-casein from skim milk. Purification of β-casein from milk is achieved through a process of microfiltration using cross-flow polymeric microfiltration membranes. Cooling of the milk prior to microfiltration results in improved separation of β-casein from the other milk serum proteins. Further filtration and demineralization of the microfiltered permeate results in enrichment of the fraction containing soluble β-casein. An integrated scheme that allows a dairy plant to continuously separate and purify β-casein is provided. Also provided is a method for obtaining cheese with improved meltability and reduced bitterness.

9 Claims, 7 Drawing Sheets

PURIFICATION OF BETA CASEIN FROM MILK

TECHNICAL FIELD

The present invention relates, in general, to methods of fractionation and purification of proteins. In particular, the methods disclosed can be used for purification of highly soluble beta casein (β-casein) from milk. With efficient removal of β-casein from milk, the present invention is also directed to the control of the bitterness and the meltability of cheese.

BACKGROUND

Bovine milk has an average protein content of 35 mg/mL. The two major protein fractions in bovine milk are the caseins and the serum milk proteins (frequently referred to as whey proteins), which account for approximately 80% and 20% of total protein, respectively.

Casein is a mixed complex of phosphoproteins that are present in all mammalian milk as colloidally dispersed micelles 50 to 600 nm in diameter. The assembly of casein micelles probably proceeds via two routes; hydrophobic interaction between groups on different molecules and calcium phosphate nanoclusters acting as a neutralizing bridge between two negatively charged phosphoseryl clusters. Small amounts of calcium phosphate together with serum ionic calcium play a significant role in micellar structure.

Casein can be separated from the whey proteins of milk by gel-filtration, high-speed centrifugation, salting-out with appropriate concentrations of neutral salts, acid precipitation at pH 4.3-4.6, precipitation with ethanol, precipitation with an anionic polysaccharide, and coagulation with rennet or other proteolytic enzymes. The majority of methods are impractical for commercial use. Commercially, for economic reasons, casein is separated from whey proteins by acid or rennet coagulation.

β-Casein is one of the four main casein proteins in milk. It has excellent functional properties, such as foaming and emulsification, and is suitable for use in a variety of food preparations. β-Casein is also the source of numerous peptides with biological/physiological activity, for example peptides that have anti-hypertensive activity, or promote mineral absorption.

In recent years, membrane technology (principally microfiltration) has also been used for the separation of casein from whey protein in milk. A few processes have been developed for the separation of casein from whey protein in milk using inorganic, primarily ceramic, microfiltration (MF) membranes (see, e.g., U.S. Pat. No. 6,485,762, incorporated herein by reference in its entirety). These processes are typically performed at a temperature in the range 45-55° C. (see, e.g., U.S. Pat. No. 6,623,871). Processing of milk at temperatures in this range can cause problems with growth of thermophilic bacteria and associated biofouling problems, fouling caused by calcium phosphate formation and deposition, enzyme activity resulting in reduced levels of intact casein and/or whey proteins, protein aggregation/gelation, and shortening of membrane life.

U.S. Pat. No. 5,169,666 discloses an ultrafiltration process for producing "humanized" bovine milk with casein/whey ratio of permeate of about 40:60. The disclosed microporous low temperature ultrafiltration process is based on 0.1-0.2 µm membranes in combination with pH and salt precipitation. The resulting permeate yields approximately 60% β-casein relative to the casein fraction.

Approximately 95% of total casein in milk is present in the form of micelles. The remainder is present in the serum phase of milk, with β-casein being the principal component of serum casein. β-Casein is the most amphiphatic and proline-rich of all the caseins with a strong potential for hydrophobic interactions. The strength of hydrophobic interactions decreases with decreasing temperature, which results in β-casein being monomeric in solution at temperatures between 0° C. and 4° C. On lowering the temperature of skim milk, the maximum concentration of β-casein in the serum phase of the milk is at temperatures in the range 0-5° C. Increasing the length of time that skim milk is stored at low temperature also increases the quantity of β-casein liberated into the serum phase.

In aqueous solution, β-casein has the ability to self-associate and form micelles with increasing temperature, in a process driven and stabilized by hydrophobic interactions. Micelles of β-casein have a diameter of approximately 30-34 nm, with about 15 to 50 monomers of β-casein per micelle. The formation of micelles by β-casein is strongly dependent on the concentration of β-casein, temperature, concentration of calcium, pH and ionic strength. The critical micelle concentration (concentration of β-casein below which formation of micelles will not occur) is reported to be 0.05 g/L at 40° C. With increasing temperature, the size of β-casein micelles increases in the temperature range 0 to 20° C., and the size of β-casein micelles remains constant irrespective of any further increase in temperature greater than 20° C.

Caseins exhibit susceptibility to charge neutralization, association and precipitation, due to the binding of calcium ions to phosphoseryl clusters on the molecule. However, the binding of calcium ions to β-casein molecules is very dependent on temperature. At 37° C., calcium concentrations in the range of 8-15 mM are sufficient to induce precipitation of β-casein. If the temperature is lowered to 1° C., β-casein remains soluble at calcium concentrations up to 400 mM.

Protein is the principal structural element of cheese. The two major components of the protein fraction in cheese are $\alpha_{s1}$- and β-casein. $\alpha_{s1}$-Casein is extensively hydrolyzed (up to about 80% hydrolysis) during ripening of Cheddar cheese, with the rate of hydrolysis being most rapid during the first 30-60 days of ripening. Conversely, only about 20-30% of total β-casein is hydrolyzed in Cheddar cheese during ripening, with the rate of hydrolysis being essentially constant during ripening.

The ratio of $\alpha_{s1}$-:β-casein in milk influences its rennet coagulation properties. Hydrolysis of β-casein enhances the heat-induced functional properties, especially meltability of cheese. Thus, reducing the concentration of β-casein in milk (i.e., increased $\alpha_{s1}$-:β-casein ratio) improves the functional properties of cheese, particularly its meltability.

Despite the apparent desirability of removing some β-casein from milk both to enhance certain properties of cheese and to obtain a natural emulsifier for use in other products, no commercially viable method of removing functional β-casein from milk has been developed. The existing methods result in contamination of milk and β-casein by enzymes and other impurities (products of β-casein hydrolysis), and generate large amounts of waste sludge that has no commercial value.

There is thus a need in the dairy industry for a process that can be used for purification of β-casein and its efficient removal from milk. The β-casein purification scheme should be more efficient and less expensive than classic purification protocols using ceramic membranes, which represent the current industry standard.

SUMMARY OF THE INVENTION

In one aspect, the present invention is directed toward a novel integrated membrane filtration process that is useful for the separation and fractionation of β-casein from whey protein in skim milk. Thus, in one aspect, the invention takes advantage of the discovery that non-ceramic, polymeric microfiltration (MF) membranes can be used for the fractionation of casein from whey protein in skim milk. The fractionation process results in β-casein with improved yield, purity, and solubility.

The separated β-casein is subjected to additional enrichment and purification through demineralization. The end results of these separation/fractionation steps are: (1) skim milk depleted of 10-20% β-casein, with increased $\alpha_{s1}$-:β-casein ratio, and (2) enriched/purified β-casein with enhanced solubility relative to that produced by other methods. This purified and highly soluble β-casein is suitable for use as an emulsifier in diverse food products.

In one aspect of the invention, the stream containing the isolated β-casein can be further processed into a purified, highly soluble β-casein, or may be used to make modified whey protein powder that contains this highly functional ingredient. β-Casein is a powerful and highly valued emulsifier and this processing scheme allows a significant amount of it to be extracted from milk without negatively impacting the cheese making properties of the milk.

In yet another aspect of the invention, the partial depletion of β-casein from milk, with a concomitant increase in the ratio of $\alpha_{s1}$-:β-casein, influences the rheological and functional properties of cheese. Most notably, depletion of β-casein from milk results in cheese with increased meltability.

In one aspect, the invention provides a method of reducing bitterness flavor defects in cheese during ripening, due to partial removal of β-casein from the cheesemilk. Peptides released from β-casein during ripening are known to be the primary contributor to bitterness in cheese.

The invention also provides an integrated scheme that allows a dairy plant to continuously separate and purify these fractions, with all streams being used in the production of several high value-added dairy products. Although there have been other attempts to produce a purified β-casein product, none appear to have been commercialized due to the lack of solubility, the presence of undesirable components, and large quantities of by-product (i.e., sludge, slurry) that has no economically attractive, feasible use. The purification scheme outlined herein overcomes all of these issues with the use of low-cost membrane systems and novel separation protocols.

DETAILED DESCRIPTION OF THE PREFERRED EMBODIMENTS

Figure 1:
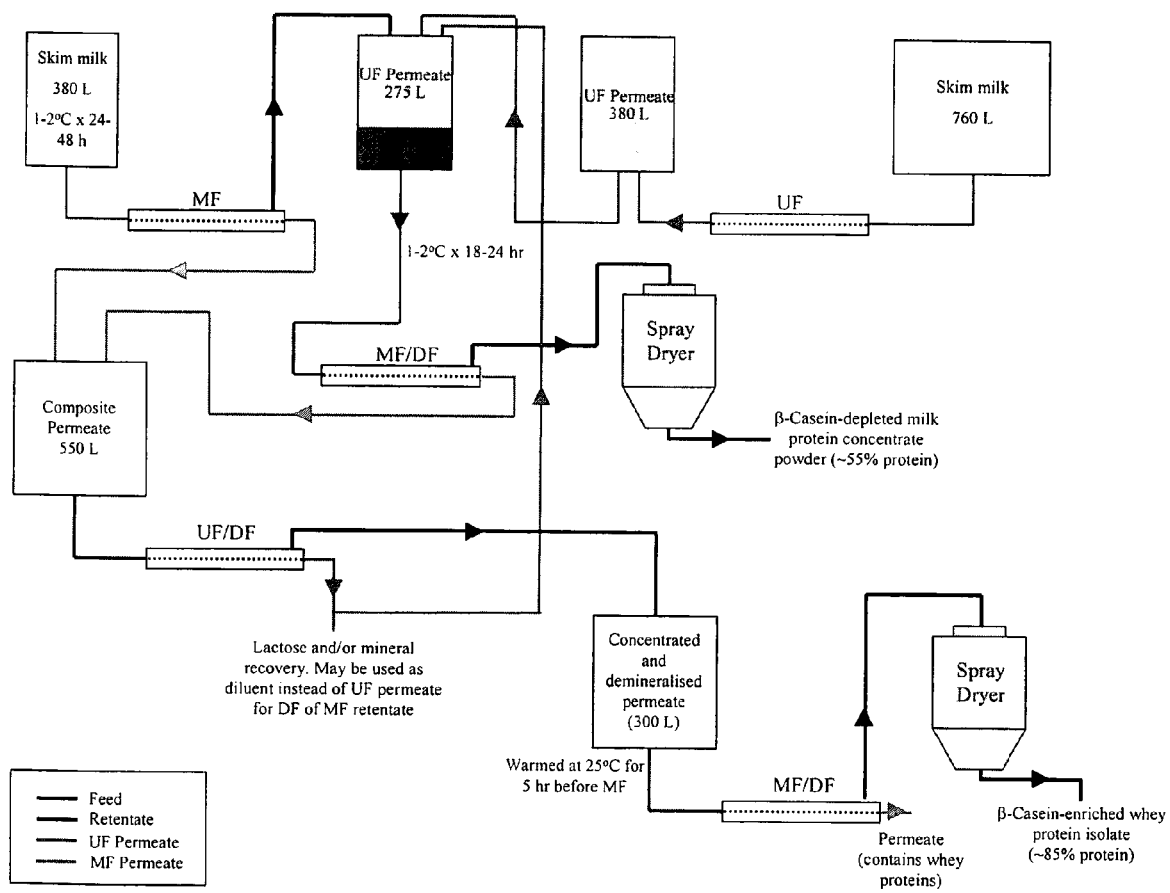
FIG. 1 shows a schematic overview of the integrated membrane filtration process for separation of casein from whey protein and for selective removal of β-casein from skim milk. Also shown are the processing steps involved in purifying β-casein from the resultant permeate and the production of a novel whey protein isolate product containing β-casein.

It is to be understood that this invention is not limited to the particular methodology, protocols, equipment, or reagents described, and as such may vary. It is also to be understood that the terminology used herein is for the purpose of describing particular embodiments only, and is not intended to limit the scope of the present invention, which is preferably limited only by the claims.

In the present context, the term "cheese" may be any kind of cheese and includes, e.g., natural cheese, cheese analogues and processed cheese. The cheese may be obtained by any suitable process known in the art, such as, e.g., by enzymatic coagulation of the cheese milk with rennet, or by acidic coagulation of the cheese milk with food grade acid or acid produced by lactic acid bacteria growth.

Milk from different species of animals may be used in the production of cheese. Thus, "milk" may be the lacteal secretion obtained by milking, e.g., cows, sheep, goats, buffaloes or camels.

In the present context, the term "filtration" refers to the process of using a filter to separate a mixture. In the dairy industry, filters are typically used in separation and/or fractionation processes, to separate into fractions and to remove molecules from milk, based on size difference.

As used herein, the term "microfiltration" (MF) is used to mean a class of filtration, driven by a pressure gradient, which typically uses membrane pore sizes of about 0.2 to 2.0 μm, preferably of about 0.5 μm, and pressures on the upstream side of the membrane ranging from 100 to 500 kPa.

As used herein, the term "ultrafiltration" is used to mean a class of filtration, driven by a pressure gradient, which typically has a molecular weight cutoff (MWCO) range from about 3,000 to about 100,000 Da. In milk separation/fractionation processes, ultrafiltration is traditionally used for fractionation of whey proteins from lactose.

As used herein, the term "diafiltration" is used to mean a specialized class of filtration in which the retentate is diluted with solvent and re-filtered, to reduce the concentration of soluble permeate components and increase further the concentration of retained components. Thus, as used herein, the term "microfiltration and diafiltration" (MF/DF) refers to a combined MF and DF separation and/or fractionation step, where MF is performed in combination with DF, i.e., the retentate is diluted with solvent and re-filtered through a MF membrane. Similarly, the term "ultrafiltration and diafiltration" refers to a combined ultrafiltration and diafiltration separation/fractionation step, where ultrafiltration is performed in combination with diafiltration, i.e., the retentate is diluted with solvent and re-filtered through an ultrafiltration membrane.

As used herein, the term "permeate" is used to mean, in relation to a filtration process, that liquid product of milk filtration which contains only those milk components that are able to pass through the filtration membrane. Permeate from MF of skim milk is the fraction that contains an increased solids mass percentage (as compared to the original skim milk) of β-casein.

As used herein, the term "retentate" is used to mean, in relation to a filtration process, that liquid product of milk filtration which is the concentrated milk feed and which contains all the components typically found in milk but with an increased solids mass percentage (as compared to the original milk) protein, fat, and minerals (ash).

As used herein, "cross-flow" membrane filtration is used to mean a class of filtration that typically produces two effluent streams, permeate and retentate. Permeate is the purified fluid that has passed through the membrane during the filtration process. The retentate is the remaining fluid that has become enriched with compounds that could not permeate the membrane.

As used herein, the term "demineralization" is used to mean, in relation to a purification process, the removal of ionized minerals and salts (both organic and inorganic) from a solution. Demineralization of the permeate refers to removal of ions, e.g. calcium and other ions, from the permeate.

In accordance with this invention, it has been discovered that polymeric MF membranes are useful for the fractionation and/or purification of β-casein from milk. Accordingly, as shown in FIG. 1, one embodiment of the invention is directed toward a new integrated membrane filtration process for the separation of caseins from whey proteins and fractionation and purification of β-casein from skim milk. In a preferred embodiment, separation of the caseins from whey protein is achieved using polymeric microfiltration membranes made from non-ceramic material.

The MF membranes could be made out of various polymers that are used for separations, including, but not limited to, cellulose acetate, polysulfone, polyethersulfone, polyamide, polyvinylidene fluoride (PVDF), charged PVDF nylon, polytetrafluoroethylene (PTFE), polypropylene, regenerated cellulose, or any mixture of the above polymers.

The pore size of the MF membrane may vary from about 0.1 μm to about 2.0 μm, corresponding to approximately 10,000 to 1,000,000 molecular weight cutoff. Preferably the pore size ranges from about 0.4 μm to about 1.0 μm, and very preferably the pore size is about 0.5 μm. For example, polyvinylidene fluoride (PVDF)-based membranes of 0.5 μm nominal pore diameter, useful for practicing the invention, are available from PTI Advanced Filtration (Oxnard, Calif.) under the name "F-Series Microfiltration Sanitary Spiral Elements".

Various types of MF membrane configurations are possible. Nonlimiting examples of MF membrane configurations include tubular, spiral wound, hollow fiber, flat sheet, plate and frame, or modular configurations.

The transmembrane pressure during MF can range, for example, from 10 kPa to 1,000 kPa. The flow rate of the permeate during MF can range, for example, from 100 $Lm^{-2}h^{-1}$ to 10,000 $Lm^{-2}h^{-1}$.

In all steps that require MF processing in the purification scheme, the same type of membranes and filtration systems can be used. Apart from the new type of polymeric MF membranes, the process outlined in the invention uses equipment that is commonplace in the dairy processing industry. For implementation in industry, the process outlined in this invention would involve only low capital expenditure.

The initial MF steps (prior to demineralization, see below) are typically carried out in the temperature range 1-6° C., preferably at 1-2° C. This ensures minimal microbiological growth and enzyme activity during the course of the process. The maximum processing temperature during the subsequent demineralization is 25-30° C. These temperatures are significantly lower than those (50-55° C.) detailed in published methods for the separation of casein and whey proteins.

It is conceivable that disruption of the micelles containing β-casein might be achieved using different mechanisms, thereby providing some equivalent steps in the scheme for purification of β-casein. For instance, the micelles containing β-casein could be disrupted through application of pressure, or with various chemicals. Since β-casein is anchored in the micelles through hydrophobic interactions, chemicals that break apart hydrophobic interaction, e.g. urea, sodium dodecyl sulfate, and equivalents could be used to liberate the caseins from the micelles.

In a preferable embodiment of the invention, improved purification of β-casein is accomplished by cooling the milk prior to MF. The cooling is performed by subjecting the milk to temperatures of about 1-6° C., preferably 1-2° C., for a period of about 12-48 hours. The cooled milk is then subjected to MF in accordance with this invention.

FIG. 1 illustrates one aspect of the invention, an integrated method of purification of β-casein using cross-flow, spiral-wound, polymeric MF membranes made from non-ceramic material. The processes in this integrated purification scheme generally consist of steps that involve MF and demineralization. The steps in this integrated scheme are described in the following paragraphs that are referring to FIG. 1.

Skim milk is cooled to a temperature of 1-2° C. and stored at that temperature for 24-48 hours before MF. During this time, β-casein dissociates from the casein micelles into the serum phase of the skim milk. The dissociated β-casein molecules in the serum phase of the skim milk are present in monomeric form in this low temperature range and are recovered in the permeate stream during the subsequent MF of the cooled skim milk (see MF, FIG. 1).

The retentate obtained by the first MF step (FIG. 1) consists of MPC solution. This retentate may be readily used for cheesemaking, either directly (as cheesemilk), or may be added to cheesemilk to enrich and standardize the protein content of cheesemilk. Cheese made using this MPC solution has increased melt and enhanced functional properties compared to cheese made from MPC solution with the normal (same as skim milk) $\alpha_{s1}$-:$\beta$-casein ratio.

To further remove $\beta$-casein while minimizing changes in the concentration of minor skim milk constituents, permeate generated by ultrafiltration (see UF, FIG. 1) of skim milk may be used to dilute the retentate obtained from the initial MF process. This mixture containing diluted MF retentate is stored at 1-2° C. for 12-18 hours before again being processed by MF under identical operating conditions as those employed for the first run (see first MF/DF, FIG. 1). The resultant microfiltration and diafiltration (MF/DF) retentate consists of MPC solution that is partially depleted (by about 10-20%) of $\beta$-casein and thus has a higher ratio of $\alpha_{s1}$-:$\beta$-casein than the original skim milk. The MPC solution can be spray dried (see first Spray Dryer in FIG. 1) into $\beta$-casein-depleted MPC powder that contains about 55% protein (or higher protein levels depending on the degree of MF/DF).

In another aspect of the invention, improved purification of $\beta$-casein is accomplished by demineralization of the composite microfiltration/diafiltration permeate. The demineralization steps reduces the amount of solids in the composite permeate, yielding further purification and enrichment of the $\beta$-casein fraction.

The permeate from the first microfiltration and diafiltration (MF/DF) process is then pooled with the initial MF permeate (see pooled permeates (MF & DF) in FIG. 1). For further enrichment and purification of $\beta$-casein, the pooled permeates solution is demineralized at low temperature (about 1-6° C.) by ultrafiltration and diafiltration with chilled water (see UF/DF in FIG. 1). In one embodiment, the $\beta$-casein component of the demineralized permeate solution is further enriched using reversible thermal-induced aggregation. The novelty of using the principle of reversible thermal-induced aggregation in the isolation/purification of $\beta$-casein is superior to existing strategies in which the $\beta$-casein fraction of various supernatant solutions/aqueous phases containing $\beta$-casein undergoes unlimited and uncontrollable aggregation in the presence of calcium ions on increasing temperature and precipitates out of solution.

Thermal aggregation and micelle formation by $\beta$-casein on heating of the composite permeate obtained from the cold process can be controlled and even reversed if the concentration of calcium in the composite permeate is reduced by demineralization. It is conceivable that demineralization of the permeate containing $\beta$-casein might be performed with other methods known in the art. For instance, calcium ions could be removed using a calcium chelator, e.g. EDTA, EGTA, or equivalent, resulting in further purification and enrichment of the $\beta$-casein fraction.

The permeate obtained through this UF/DF filtration can be used as diluent for diafiltration of the microfiltered retentate, instead of ultrafiltered permeate (see UF Permeate 275 L in FIG. 1). That way the permeate is recycled and reused in the purification scheme (see FIG. 1).

The ash content of the resulting permeate solution is decreased by about 85% during this demineralization process. The temperature of the permeate solution is then increased from 2° C. to 25° C. to facilitate hydrophobic aggregation (micelle formation) of the $\beta$-casein molecules.

Subsequently, the permeate solution (with $\beta$-casein in polymerized state) is circulated through the same MF system used for the process outlined above (see second MF/DF in FIG. 1). For this process, water (at 25° C.) is used as DF medium once the minimum system volume is reached. Following this (second) MF/DF filtration, the resulting permeate contains whey proteins, whereas the retentate contains $\beta$-casein-enriched product. This product may be spray dried into powder that contains about 85% protein (see second Spray Dry in FIG. 1). During this combined MF and DF processing step, the casein nitrogen content (principally $\beta$-casein) of the initial permeate solution (expressed as percentage of the total nitrogen content) approximately doubles, increasing from about 16.5% to about 34.1%. Further MF/DF processing could be used to additionally increase the $\beta$-casein (or protein) content of this fraction.

The filtration principles outlined for the isolation/purification of $\beta$-casein from a solution containing $\beta$-casein (among other proteins) may be applied to many of the other methods previously described for $\beta$-casein isolation. Notwithstanding the advantages to be gained by using the MF process outlined above, the demineralization process through reversible thermal-induced aggregation in the isolation/purification of $\beta$-casein may be applied individually. It may be used to supplement the already existing methods for fractionation and purification of proteins, more specifically $\beta$-casein. The use of this novel technique yields a more native, soluble, functional ingredient than using crude thermal aggregation and precipitation of $\beta$-casein in the presence of calcium ions. This also eliminates the need for expensive separation equipment such as decanter centrifuges.

The yield of $\beta$-casein (10-20% of the total $\beta$-casein content of the original skim milk) obtained using the methods outlined in the purification scheme is several fold higher than that reported for many of the previous documented methods. This is especially true for methods involving extraction of $\beta$-casein from solid casein feedstocks, where the yield of $\beta$-casein is typically about 2-3%.

In one aspect, the invention provides a solution containing highly soluble $\beta$-casein. In a preferred embodiment, the invention provides solution that includes $\beta$-casein of solubility greater than 99% (weight/volume). Preferably, the $\beta$-casein is solubilized in water. Alternatively, the $\beta$-casein is solubilized in water/solvent.

Protein solubility can be determined by methods known in the art. A preferred method for determining protein solubility is centrifugation of a protein solution, and measurement of the protein content of the supernatant and its comparison with the original protein concentration of the protein solution. Protein solubility can also be qualitatively estimated from the amount of protein sedimenting as a result of centrifugation; a small amount of sediment indicates high solubility.

The permeate stream generated on demineralization of the initial MF permeate solution may be used for diluting the initial MF retentate (see FIG. 1) instead of UF permeate. Both diluents are free of casein and whey proteins but have identical ash contents and similar pH. This represents a big cost saving to the industry in the form of both reduced water demand and permeate processing.

In one aspect, the invention is directed toward a method for producing a MPC solution partially depleted of $\beta$-casein from pasteurized skim milk using a MF system equipped with polymeric membranes. The obtained retentate (MPC solution) may be readily used for cheesemaking—either directly (as cheesemilk) or may be added to cheesemilk to enrich or standardize the protein content of cheesemilk. Cheese made using this MPC solution has increased melt and enhanced functional properties compared to cheese made from MPC solution with the normal (same as skim milk) $\alpha_{s1}$-:$\beta$-casein ratio.

In one aspect, the invention provides a method of reducing bitterness flavor defects in cheese during ripening, due to partial removal of $\beta$-casein from the cheesemilk. Bitterness in cheese is due to the accumulation of bitter peptides. These peptides usually contain a high proline content and have a hydrophobic character. Peptides released from β-casein during ripening are known to be the primary contributor to bitterness in cheese, e.g. β-casein f193-209.

The concentration of bitter peptides in cheese can be measured by mass spectrometry, high pressure liquid chromatography and other such techniques that are common techniques for quantification of peptides. In practice, bitterness is easily detected and quantified by sensory analysis using either experienced cheese graders or trained sensory panels.

Unlike the whey stream obtained from cheesemaking, the permeate generated using this integrated process is free from curd fines, lipid material, added color, glycomacropeptide, lactic acid, residual coagulant activity, and starter culture. The permeate also has a lower ash content than cheese whey and has a pH of about 6.70-6.80, similar to that of skim milk. These differences in composition mean that whey protein concentrate (WPC) and whey protein isolate (WPI) products with high protein contents can be produced more economically, with less pretreatments, from MF permeate than cheese whey. Due to the absence of contaminating materials, and a reduction in the number of thermal processes involved, whey proteins purified directly from skim milk using MF are referred to as being in the native, virgin or unadulterated state ("ideal whey" or "virgin serum") and may be able to command a premium price on the market. One of the major problems food product formulators experience with whey protein products is inconsistency with respect to functionality. These inconsistencies are primarily caused by many of the factors listed above (e.g., presence of residual lipids and denatured whey proteins), but would be overcome by the purification process described herein.

With continued concentration by MF and/or DF it should be possible to further purify and enrich the β-casein fraction of the demineralized composite permeate, thereby obtaining a substantially pure β-casein product. With larger membrane systems, subsequent processing and further purification of β-casein could proceed. Selective pre-treatment of the stream to be filtered (i.e., cooling of skim milk or warming of demineralized composite permeate from the cold process) allows β-casein to be directed to either permeate or be retained by the membrane.

Notwithstanding the benefits of implementing the entire processing scheme as outlined herein, the principle of reversible thermal aggregation of β-casein in demineralized permeates obtained from cold MF of milk (or any other source of β-casein in the liquid form) may, in itself, be applied individually to a process involving the fractionation and purification of β-casein. Therefore, the same MF membranes and filtration system can be used for all MF processing steps of the proposed integrated process.

Milk proteins are in their native state in all streams of the integrated process described herein; consequently, all streams can be easily processed to give highly soluble and functional milk proteins using standard dairy processing equipment. With many of the methods developed previously for fractionation and purification of β-casein, the material remaining after removal of β-casein is present in an insoluble/sludge form and is not easily or readily incorporated into other processes/products, carrying with it an economic burden with respect to further processing. As a direct effect of the absence of a renneting step in the process described herein, β-casein purified using this process is intact (i.e., unhydrolyzed).

β-Casein is considered a premium surface-active agent, with significant emulsifying/foaming activity. Its incorporation with "native/virgin" whey (serum) proteins in the production of whey protein concentrate/isolate-type products represents an opportunity for development of a new value-added milk protein product category with excellent functional properties. This is achieved by not removing or purifying β-casein from the composite MF/DF permeate obtained from the cold process; instead, the β-casein and whey protein can be concentrated by UF/DF as is currently practiced for whey protein concentrate (WPC) and whey protein isolate (WPI) products.

EXAMPLES

Integrated Filtration Process

As shown in FIG. 1, skim milk (380 L) was processed to a volume concentration factor (VCF) of 3.6 by MF, diluted to 380 L with permeate from ultrafiltration (UF) of skim milk and diafiltered (DF) to a VCF of 3.6. The filtration was performed at 2-5° C. (cold process) in three replica experiments. As a control used for comparison, in a separate experiment filtration was performed at 21-24° C. (warm process).

In addition to whey protein, permeate from the cold process contained casein (0.06 g/100 g), the majority (>93%) of which was β-casein; 9.41% of the total β-casein content of the original skim milk was removed in the composite (combined MF and DF) permeate by the cold process.

Diafiltered retentates were spray-dried to produce MPC powders with ratios of $\alpha_{s1}$-:β-casein of 1.00:1.08 and 1.00:1.00 for the warm and cold processes, respectively. MPC powders produced by both the warm and cold processes had a protein content of about 54%, with casein protein constituting 95.1% and 88.2% total protein, respectively.

Concentration and demineralization by combined UF/DF reduced the ratio of calcium to casein by about 5-fold (i.e., from 56.5% to 10.7%) in composite permeate from the cold process. This reduction in calcium concentration prevented precipitation, and made possible the controlled and reversible thermal aggregation and micelle formation by β-casein molecules upon heating of the demineralized composite permeate to 26° C.

Combined MF and DF processing of the demineralized composite permeate at 26° C. (using same equipment as used for MF/DF of skim milk) enriched the casein fraction by approximately 200%. Casein represented 40.1% of true protein in the demineralized composite permeate after MF/DF processing in comparison to only 21.2% of true protein in the permeate before processing.

Cooling of Milk

Approximately 380 L skim milk was stored at 1.5-2.0° C. for 48 h before processing, for the purposes of releasing β-casein from the micelles containing β-casein. For the warm MF process (used as control), skim milk (380 L) was stored at 1.5-2.0° C. for 48 h, then warmed to 20-22° C. before processing.

Microfiltration of Cooled Milk

A microfiltration system (APV Americas, Tonawanda, N.Y.) was used for microfiltration (MF) of skim milk. The unit was equipped with 2 commercial-size, spiral wound, polyvinylidene fluoride (PVDF) membranes, each with pore size 0.5 μm and membrane area of 2.72 m² (FH 3819; PTI Advanced Filtration, Oxnard, Calif.), arranged in parallel. The system was operated in batch retentate re-circulation mode under the following conditions: inlet pressure 193 kPa, outlet (back) pressure 103 kPa, and flow rate of feed across each membrane module was 1292 $Lm^{-2}h^{-1}$. The pressure drop across the membrane was 90 kPa with a transmembrane pressure of 148 kPa.

For the novel, cold process, the tank unit of an Alcurd automatic cheesemaker was used to maintain the temperature of the re-circulating retentate less than 6.0° C. during MF. Skim milk (380 L) was processed to a volume concentration factor (VCF) of about 3.6 in approximately 6 h.

A pilot-scale UF system was used for UF of skim milk in the generation of UF permeate for dilution of MF retentate. The unit was equipped with 2 polyethersulfone membranes, each with molecular weight cut-off (MWCO) of 10,000 Da and with membrane area of 5.57 m$^2$ (PTI Advanced Filtration, Oxnard, Calif.), arranged in series. The system was operated in batch retentate re-circulation mode, under the following conditions: inlet pressure 365 kPa, retentate outlet (back) pressure 193 kPa and flow rate of feed across membrane module was 611 Lm$^{-2}$h$^{-1}$. The pressure drop across the membrane was 172 kPa with a transmembrane pressure of 279 kPa. Skim milk (760 L) was processed to a volume concentration factor (VCF) of 2 in less than 5 h. The ultrafiltered permeate was combined with the microfiltered retentate to obtain a mixture that was further subjected to microfiltration and diafiltration (MF/DF) using the same polymeric MF membrane as above.

Demineralization

Further purification of β-casein from the composite microfiltration/diafiltration (MF/DF) permeate was performed (see composite permeate in FIG. 1). The same pilot-scale UF system that was used in the generation of UF permeate from skim milk (see above) was used for concentration and demineralization of composite (MF and DF) permeate; however, the operating conditions were different. The system was operated under the following conditions: inlet pressure 290 kPa, outlet (back) pressure 165 kPa, flow rate of feed across membrane module 574 Lm$^{-2}$h$^{-1}$. The pressure drop across the membrane was 125 kPa with a transmembrane pressure of 228 kPa.

The composite permeate was concentrated from 550 L to 300 L (VCF=1.8) with an average permeate flow rate of 13.7 Lm$^{-2}$h$^{-1}$. The concentrated composite permeate was then demineralized by continuous DF under the same operating conditions as those used in the above concentration process, except that chilled water (1.0° C.) was fed continuously for 7 hours into the feed/retentate tank with a flow rate of 153 Lh$^{-1}$. Thus, a total volume of 1070 L of water was used to demineralize the permeate (550 L original permeate volume). Hence, approximately two parts water were used to demineralize one part permeate.

One skilled in the art would be able to use variations in the amount of water and permeate during demineralization. For example, in another embodiment, demineralization can be achieved using 0.5 volumes of water: 1 volume of permeate.

The concentrated and demineralized composite permeate was further processed by microfiltration and diafiltration (MF/DF). The temperature of the demineralized composite MF/DF permeate was raised from 1 to 26° C. The same pilot-scale MF system as used for separation of casein from whey proteins in skim milk and selective removal of the β-casein fraction from skim milk (see above) was used for concentration/purification of β-casein in the demineralized composite MF/DF permeate. However, the operating conditions were as follows: inlet pressure 97 kPa, outlet (back) pressure 34 kPa, and flow rate of feed across each membrane module was 1282 Lm$^{-2}$ h$^{-1}$. The pressure drop across the membrane was 63 kPa with a transmembrane pressure of 66 kPa.

The volume of demineralized composite permeate was reduced from 300 to 40 L (VCF=7.5) by MF with an average permeate flow rate of 12.5 Lm$^{-2}$ h$^{-1}$. The retentate was then batch diafiltered 4 times with 40 L of water at 26° C.; total volume of DF water added was 160 L. After processing, the final retentate (40 L) was cooled to 2° C., held at that temperature overnight and spray-dried using a gas-fired, pilot-scale spray dryer (PSD 55, APV, Copenhagen, Denmark). The dry product (14-15 kg) was collected in a cyclone, removed at 45 min intervals and stored in sealed, lightproof containers (about 5 kg each).

The assumption was made that β-casein constitutes 35% of the total casein in skim milk. β-Casein was estimated to constitute 93.4% of total casein in the composite permeate from the cold process based on densitometric analysis of SDS-PAGE gel electrophoretograms of the composite permeate. The volume of composite (MF and DF) permeate generated during the cold process was 550 L. The amount of β-casein removed from skim milk by the cold MF process was expressed as a percent (%) of the total β-casein content of the original skim milk.

For integrated filtration purposes, ultrafiltered permeate was used for dilution of the microfiltered retentate. Skim milk used for generation of UF permeate had composition identical to that of skim milk used as MF feed (since it was from the same batch of milk). The composition of UF permeates used for dilution of MF retentate back to original volume is given in Table 1. As caseins and whey proteins were unable to permeate the 10,000 Da MWCO UF membrane, the crude protein content (0.18 g/100 g) of the UF permeates was composed entirely of non-protein nitrogen (NPN) (e.g., urea, uric acid, creatine and creatinine). UF permeate was used instead of water in an effort to minimize changes in pH and mineral equilibrium caused by removal of soluble ash (especially calcium) during initial MF processing, as this may alter fmal MPC functionality.

Alternatively, in a continuous, integrated process, permeate generated from demineralization of the composite permeates from the cold process (FIG. 1) may be used to dilute the MF retentate. Both diluents are free from casein and whey proteins, have identical ash contents and similar pH. This would eliminate the need for generation of UF permeate and reduce the cost of processing permeate obtained from the demineralization process.

TABLE 1

Composition of ultrafiltration permeate produced in the cold and warm processes

| | Composition | |
| --- | --- | --- |
| Parameter | Warm Process | Cold Process |
| pH | 6.77$^a$ (0.02) | 6.79$^a$ (0.07) |
| Total Solids (g/100 g) | 5.32$^a$ (0.00) | 5.41$^a$ (0.12) |
| Ash (g/100 g) | 0.51$^a$ (0.06) | 0.49$^a$ (0.02) |
| Calcium (mg/100 g) | 32.7$^a$ (0.93) | 34.0$^a$ (0.18) |
| Lactose (g/100 g) | 4.59$^a$ (0.01) | 4.67$^a$ (0.16) |
| Crude Protein (g/100 g) | 0.18$^a$ (0.00) | 0.18$^a$ (0.01) |

Numbers represent means and standard deviations, with the latter in parentheses (n = 3). Means within a row wifferent superscripts are significantly different (Tukey's HSD, P ≤ 0.05).

The temperature of the retentate was maintained within the range 3.0-6.0° C. during the cold MF and DF processes. For the control experiment (warm process), the temperature of the retentate was maintained within the range 21.0-24.0° C. during the warm MF/DF.

Figure 2:
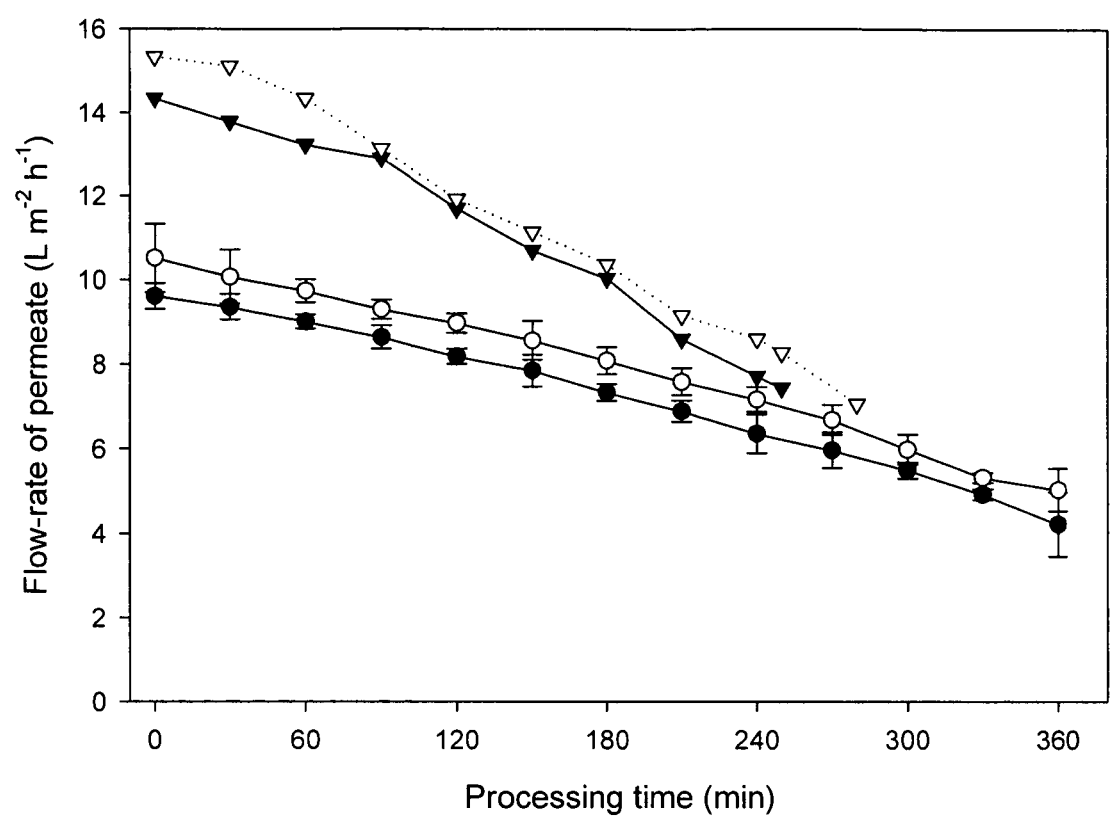
FIG. 2 shows the flow rate of permeate during microfiltration (closed symbols) and subsequent diafiltration (open symbols) of skim milk for the novel cold (●, ○) and the standard warm (▼, ▽) processes. Data points represent means from triplicate analysis and single measurements for the cold and warm processes, respectively. Error bars indicate ± one standard deviation for the cold process.

The initial permeate flow rate was 9.61 and 10.5 Lm$^{-2}$ h$^{-1}$ for the cold MF and DF processes, respectively. The permeate flow rate for both the cold MF and DF processes decreased linearly (FIG. 2). Overall, permeate flow rates decreased by 40 to 60% during the MF and DF steps for both the warm and cold processes. The decrease in flow rate of permeate during processing occurred more rapidly for the warm process than the cold process. The rate of decrease of flow rate of permeate during MF processing for the cold and warm processes was 0.015 and 0.029 $Lm^{-2} h^{-1}$ per min. The decrease in permeate flow rate coincides with a VCF of ~3.6 at the end of processing and is most likely due to fouling, caused by deposition and adsorption of protein onto the membrane surface or within the pores of the membrane. Increasing the initial temperature of the skim milk from 3.3° C. (cold process) to 21.4° C. (warm process) increased the initial permeate flow rate from 9.61 to 14.3 and from 10.5 to 15.3 $Lm^{-2} h^{-1}$ for the MF and DF processing steps, respectively. Thus, an 18° C. rise in temperature of the skim milk increased the flow rate of permeate by approximately 45%.

The composition of the feed, permeate and retentate fractions from the MF and DF steps of the cold and warm processes are shown in Tables 2 and 3, respectively. There were no gross differences in chemical composition between the skim milk supplies used for the warm and cold processes. Ash, calcium, lactose and whey proteins readily permeated the MF membranes, irrespective of the processing temperature. The temperature at which the MF/DF processing was conducted had no effect on the concentration of ash, calcium or lactose in the permeate fractions. Similarly, there was little change in the concentration of each of these constituents in the permeate fractions over time, i.e., between the samples taken at 1 h, 3 h or bulk samples.

The crude protein content of the composite permeate (combined MF and DF permeates) from the cold process was 0.36 g/100 g (Table 2). The values for crude protein content of the bulk MF and DF permeates from the warm process were similar (Table 3). The non-protein nitrogen (NPN) accounted for approximately 50% of total crude nitrogen for both the cold and warm processes, i.e., the level of NPN (about 0.03 g/100 g) was essentially constant in all permeates, irrespective of processing temperature or stage in the process.

The ratios of calcium to total protein and calcium to casein in the MF feed were typical for that of skim milk. DF retentates from the cold and warm processes had calcium to casein ratios of 3.53 and 3.16%, respectively. The ratio of calcium to casein decreased by approximately 25% during MF and DF processing due to the removal of soluble calcium in the permeate. The concentration of calcium in bovine milk is 1200 mg/L, about 400 mg/L of which is in the soluble form. The remaining 800 mg/L of calcium is present in the colloidal form—associated with the casein micelle. It has been established that the retention of calcium during membrane processing is extremely dependent on the proportion of total calcium associated with the casein micelle.

The extent of removal of whey proteins from the skim milk appeared to be greater for the warm process than the cold process. For the warm process, the concentration of casein (expressed as % of true protein) for skim milk, MF retentate, and DF retentate was 81.9, 91.2 and 95.1%, respectively (Table 3). In comparison, for the cold process, the concentration of casein (expressed as % of true protein) for skim milk, MF retentate and DF retentate was 82.6, 86.2 and 88.4%, respectively (Table 2). These results illustrate that approximately 73% and 33% of total whey protein was removed from the skim milk during the warm and cold processes, respectively. Casein accounts for 92, 95 and 93% of crude protein, respectively, in native phosphocaseinate produced from skim milk by MF. In comparison, the level of casein (expressed as % of crude protein) in DF retentate from the warm MF process described herein was 92.2%.

TABLE 2

Chemical composition of skim milk feed, permeate and retentate fractions obtained from microfiltration and subsequent diafiltration of skim milk for the cold process

| Composition | Microfiltration | | | | | Diafiltration |
|---|---|---|---|---|---|---|
| | Feed | Permeate 1 hr | Permeate 3 hr | Permeate Bulk | Retentate | Feed |
| pH | 6.71 (0.06) | 6.83 (0.02) | 6.85 (0.02) | 6.84 (0.01) | 6.68 (0.01) | 6.74 (0.02) |
| Total Solids (g/100 g) | 8.70 (0.24) | 5.77 (0.10) | 5.70 (0.27) | 5.74 (0.22) | 14.8 (0.62) | 8.23 (0.26) |
| Ash (g/100 g) | 0.70 (0.01) | 0.50 (0.04) | 0.49 (0.02) | 0.49 (0.08) | 1.07 (0.05) | 0.62 (0.02) |
| Calcium (mg/100 g) | 111 (4.46) | 37.3 (1.19) | 36.9 (0.66) | 36.5 (2.32) | 258 (6.76) | 99.7 (7.47) |
| Lactose (g/100 g) | 4.70 (0.23) | 4.84 (0.10) | 4.78 (0.27) | 4.81 (0.22) | 5.10 (0.62) | 4.84 (0.26) |
| Crude Protein (g/100 g) | 3.19 (0.11) | 0.39 (0.01) | 0.39 (0.01) | 0.40 (0.00) | 8.62 (0.01) | 2.67 (0.19) |
| True Protein (g/100 g) | 2.99 (0.13) | 0.21 (0.02) | 0.21 (0.02) | 0.22 (0.01) | 8.41 (0.02) | 2.48 (0.20) |
| Casein (g/100 g) | 2.47 (0.09) | 0.07 (0.02) | 0.06 (0.02) | 0.06 (0.01) | 7.25 (0.06) | 2.12 (0.14) |
| Casein as % of crude protein | 77.5 (0.04) | 17.9 (15.5) | 15.1 (5.08) | 14.6 (2.14) | 84.1 (0.61) | 79.4 (0.33) |
| Casein as % of true protein | 82.6 (0.75) | 32.7 (6.32) | 27.5 (7.81) | 26.8 (3.22) | 86.2 (0.60) | 85.4 (1.26) |
| Ratio of calcium to total protein (%) | 3.50 (0.04) | 9.48 (0.06) | 9.40 (0.53) | 9.13 (0.58) | 2.99 (0.08) | 3.73 (0.07) |
| Ratio of calcium to casein (%) | 4.54 (0.05) | 56.1 (14.3) | 66.5 (23.4) | 64.2 (13.8) | 3.56 (0.07) | 4.70 (0.09) |

| Composition | Diafiltration | | | | Composite Permeate |
|---|---|---|---|---|---|
| | Permeate 1 hr | Permeate 3 hr | Permeate Bulk | Retentate | |
| pH | 6.85 (0.03) | 6.85 (6.85) | 6.87 (6.87) | 6.73 (0.05) | 6.88 (0.05) |
| Total Solids (g/100 g) | 5.65 (0.21) | 5.69 (0.20) | 5.69 (0.17) | 13.9 (0.84) | 5.71 (0.02) |
| Ash (g/100 g) | 0.46 (0.03) | 0.43 (0.02) | 0.43 (0.07) | 1.04 (0.05) | 0.41 (0.03) |
| Calcium (mg/100 g) | 35.5 (0.94) | 35.5 (0.46) | 34.2 (1.14) | 235 (22.8) | 34.0 (2.92) |
| Lactose (g/100 g) | 4.79 (0.21) | 4.87 (0.20) | 4.88 (0.17) | 3.08 (0.84) | 4.90 (0.02) |
| Crude Protein (g/100 g) | 0.36 (0.04) | 0.35 (0.03) | 0.35 (0.01) | 7.72 (0.70) | 0.36 (0.01) |
| True Protein (g/100 g) | 0.18 (0.02) | 0.17 (0.02) | 0.17 (0.02) | 7.53 (0.70) | 0.18 (0.01) |

TABLE 2-continued

Chemical composition of skim milk feed, permeate and retentate fractions obtained from microfiltration and subsequent diafiltration of skim milk for the cold process

| | | | | | |
|---|---|---|---|---|---|
| Casein (g/100 g) | 0.09 (0.03) | 0.05 (0.01) | 0.06 (0.00) | 6.65 (0.57) | 0.06 (0.00) |
| Casein as % of crude protein | 16.5 (8.22)) | 15.5 (1.55) | 15.4 (2.50) | 86.2 (0.55) | 16.7 (0.69) |
| Casein as % of true protein | 35.6 (15.6) | 32.5 (2.46) | 31.5 (6.72) | 88.4 (0.72) | 27.9 (4.50) |
| Ratio of calcium to total protein (%) | 9.96 (1.38) | 10.2 (0.76) | 9.87 (0.63) | 3.04 (0.08) | 9.33 (0.98) |
| Ratio of calcium to casein (%) | 45.7 (20.8) | 66.5 (6.26) | 60.0 (6.91) | 3.53 (0.12) | 56.5 (8.13) |

Numbers represent means and standard deviations, with the latter in parentheses (n = 3).

TABLE 3

Chemical composition of skim milk feed, permeate and retentate fractions obtained from microfiltration and subsequent diafiltration of skim milk for the warm process

| | Microfiltration | | | | |
|---|---|---|---|---|---|
| Composition | Feed | Permeate 1 hr | Permeate 3 hr | Permeate Bulk | Retentate |
| pH | 6.72 (0.01) | 6.67 (0.01) | 6.66 (0.03) | 6.70 (0.02) | 6.60 (0.01) |
| Total Solids (g/100 g) | 8.80 (0.02) | 5.75 (0.01) | 5.71 (0.01) | 5.83 (0.01) | 14.2 (0.03) |
| Ash (g/100 g) | 0.75 (0.01) | 0.47 (0.07) | 0.56 (0.00) | 0.55 (0.03) | 1.17 (0.02) |
| Calcium (mg/100 g) | 105 (0.93) | 29.8 (2.71) | 31.5 (0.46) | 35.2 (4.87) | 241 (3.26) |
| Lactose (g/100 g) | 4.69 (0.03) | 4.92 (0.01) | 4.73 (0.01) | 4.88 (0.01) | 4.36 (0.03) |
| Crude Protein (g/100 g) | 3.25 (0.03) | 0.33 (0.01) | 0.39 (0.02) | 0.36 (0.01) | 8.45 (0.04) |
| True Protein (g/100 g) | 3.05 (0.03) | 0.14 (0.01) | 0.20 (0.02) | 0.17 (0.01) | 8.25 (0.04) |
| Casein (g/100 g) | 2.48 (0.03) | —* | — | — | 7.52 (0.00) |
| Casein as % of crude protein | 77.3 (0.31) | — | — | — | 89.0 (0.04) |
| Casein as % of true protein | 81.9 (0.48) | — | — | — | 91.2 (0.04) |
| Ratio of calcium to total protein (%) | 3.27 (0.00) | — | — | — | 2.85 (0.03) |
| Ratio of calcium to casein (%) | 4.28 (0.00) | — | — | — | 2.97 (0.03) |

| | Diafiltration | | | | |
|---|---|---|---|---|---|
| Composition | Feed | Permeate 1 hr | Permeate 3 hr | Permeate Bulk | Retentate |
| pH | 6.71 (0.01) | 6.76 (0.01) | 6.73 (0.02) | 6.77 (0.03) | 6.68 (0.02) |
| Total Solids (g/100 g) | 8.21 (0.02) | 5.43 (0.01) | 5.55 (0.03) | 5.46 (0.00) | 13.8 (0.03) |
| Ash (g/100 g) | 0.70 (0.01) | 0.53 (0.00) | 0.51 (0.04) | 0.42 (0.11) | 1.14 (0.03) |
| Calcium (mg/100 g) | 99.7 (0.27) | 25.1 (9.30) | 30.8 (1.69) | 28.7 (2.98) | 235 (12.9) |
| Lactose (g/100 g) | 4.56 (0.02) | 4.59 (0.02) | 4.78 (0.03) | 4.71 (0.01) | 4.34 (0.03) |
| Crude Protein (g/100 g) | 2.85 (0.05) | 0.28 (0.00) | 0.22 (0.01) | 0.30 (0.00) | 8.04 (0.03) |
| True Protein (g/100 g) | 2.67 (0.05) | 0.09 (0.00) | 0.03 (0.01) | 0.11 (0.00) | 7.85 (0.03) |
| Casein (g/100 g) | 2.58 (0.00) | — | — | — | 7.42 (0.06) |
| Casein as % of crude protein | 90.5 (0.08) | — | — | — | 92.2 (0.81) |
| Casein as % of true protein | 96.8 (0.09) | — | — | — | 95.1 (0.04) |
| Ratio of calcium to total protein (%) | 3.48 (0.03) | — | — | — | 2.92 (0.12) |
| Ratio of calcium to casein (%) | 3.85 (0.03) | — | — | — | 3.16 (0.13) |

Numbers represent means and standard deviations, with the latter in parentheses (n = 3).
*parameter not measured.

Figure 3:
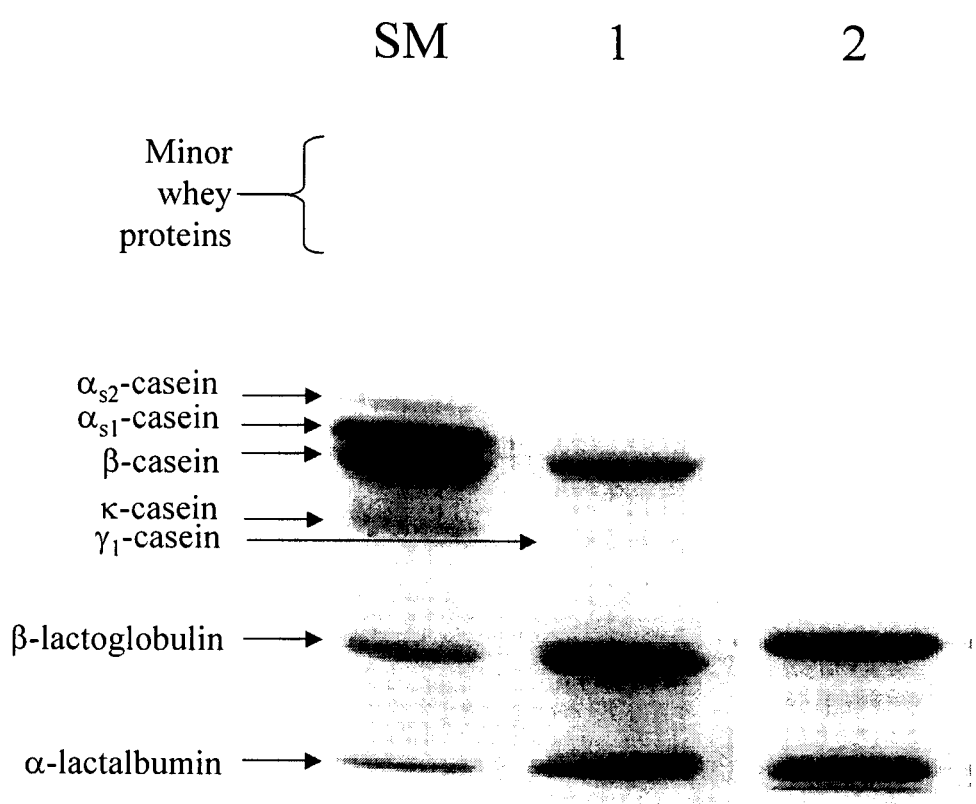
FIG. 3 is a sodium dodecyl sulphate-polyacrylamide gel electrophoretogram of skim milk (SM) and bulk MF permeate from the novel cold (2-5° C.) process (lane 1), and from the warm (21-24° C.) process (lane 2).

The composition of permeates from the MF and DF steps of the cold process were similar to that of cheese whey, except for the presence of casein (Table 2). For the cold process, the concentration of casein in both the bulk MF and DF permeate was 0.06 g/100 mL. SDS-PAGE analysis of the bulk permeates obtained from the MF step of the warm and cold processes is shown in FIG. 3. It is clear that β-casein was the principal casein present in permeate from the cold process, with γ1-casein being the only other detectable casein contaminant (FIG. 3). Densitometric analysis of SDS-PAGE gel electrophoretograms of permeates from the cold process showed that the intensity of the β-casein band accounted for 95.7, 93.6 and 93.4% of total intensity of casein (i.e., sum of β- and γ1-casein band intensities) in the bulk MF permeate, bulk DF permeate and composite permeate, respectively. The amount of β-casein removed from skim milk by the cold MF process was 9.41±0.52% of the total β-casein content of the original skim milk.

The composition of MPC powders obtained from spray drying of DF retentates from the warm and cold processes are shown in Table 4. The ash content of the MPC powder from the cold process was significantly lower than that of the powder from the warm process; however, there were no significant differences between the calcium, lactose or crude protein contents of the two powders. Due to the greater efficiency of removal of whey proteins from skim milk during the warm MF process than the cold MF process, casein represented 92.2% of the crude protein content of the powder from the warm process as opposed to 86.2% for the powder from the cold process. With the removal of almost 10% of total β-casein from skim milk during the cold MF process, the ratio of $\alpha_{s1}$-:β-casein was 1.00:1:00 for the powder from the cold process in comparison to 1.00:1.08 for the powder from the warm process.

TABLE 4

Comparative example of the compositions of milk protein concentrate powders produced by spray-drying diafiltration retentates from the warm and cold processes

| Composition | Warm Process | Cold Process |
| --- | --- | --- |
| Moisture (g/100 g) | $4.25^a$ (0.05) | $4.01^b$ (0.12) |
| Ash (g/100 g) | $7.94^a$ (0.10) | $5.61^b$ (0.25) |
| Calcium (g/100 g) | $1.72^a$ (0.03) | $1.75^a$ (0.09) |
| Crude Protein (g/100 g) | $54.0^a$ (1.36) | $54.2^a$ (0.55) |
| Lactose (g/100 g) | $31.0^a$ (0.02) | $31.6^a$ (2.59) |
| Casein as % of crude protein | 92.2 | 85.9 |
| Casein as % of true protein | 95.1 | 88.2 |
| Ratio of $\alpha_{s1}$-:β-casein | 1.00:1.08 | 1.00:1.00 |

Numbers represent means and standard deviations, with the latter in parentheses (n = 3). Means within a row with different superscripts are significantly different (Tukey's HSD, P ≤ 0.05)

Figure 4:
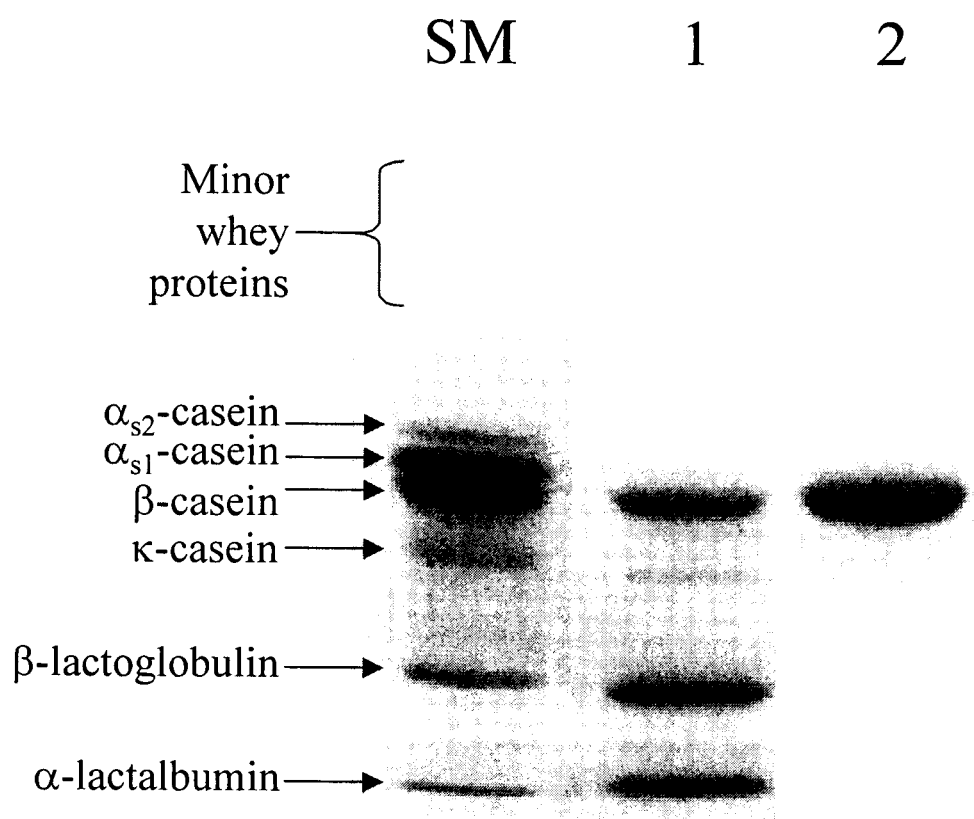
FIG. 4 is a sodium dodecyl sulphate-polyacrylamide gel electrophoretogram of skim milk (SM), composite permeate from the novel cold process (lane 1), and powder obtained by freeze-drying the washed precipitate recovered after heating the composite microfiltration/diafiltration (MF/DF) permeate from the cold process from 1.5° C. to 25° C. at a rate of 0.5° C./min and holding it at 25° C. for 50 min (lane 2).

Recovery/Purification of β-casein from Composite Microfiltration/Diafiltration Permeate from Cold Process
Example: Warming of Composite Microfiltration/Diafiltration Permeate without Demineralization While warming, the β-casein molecules in the composite permeate associated to form micelles and, after approximately 20 min of holding at 25° C., the micelles underwent extensive aggregation, with the aggregated material precipitating rapidly and forming a curd-like deposit on the bottom of the tank. The protein content of the freeze-dried powder was 72.2+1.34%. SDS-PAGE analysis revealed the protein fraction of the powder to be composed entirely of β-casein (FIG. 4). Thus, raising temperature of combined MF/DF permeate to induce aggregation and/or precipitation of β-casein is a useful means of recovering β-casein. However, one of the major limitations of this approach is that the β-casein recovered in such a manner is subsequently insoluble, which greatly limits the use of the product as a functional ingredient. To overcome the limitations of the approach described previously for recovery of β-casein from the composite permeate an alternative, the new process described below was developed.
Example: Demineralization of Composite Microfiltration/Diafiltration Permeate Prior to Warming Prior to demineralization, the composite MF/DF permeate was concentrated by UF from 550 to 300 L to reduce the quantity of chilled water required for demineralization. The composition of the composite permeate before and after concentration and demineralization is given in Table 5. Concentration of composite MF/DF permeate, by UF, reduced the ratio of calcium to casein in the composite permeate from 56.5 to 42.1%. Subsequent demineralization reduced further the concentration of calcium in the composite permeate from 37.9 to 8.42 mg/100 g. Consequently, the ratio of calcium to casein in the composite permeate decreased from 42.1 to 10.7% as a result of demineralization. The concentration of total solids in the composite permeate before and after demineralization was 6.08 and 0.59 g/100 g, respectively. The level of solids in the composite permeate (i.e., retentate stream during concentration and demineralization) decreased from 5.2 to 1.1% during the first 380 min of processing, as indicated by refractive index measurements.

There were no detectable levels of casein in either of the two permeate streams from MF processing (Table 5), which was confirmed by SDS-polyacrylamide gel electrophoresis of permeate samples obtained from the concentration step and each of the four subsequent batch diafiltrations of the demineralized composite permeate at 26° C. (FIG. 5). β-Lactoglobulin and α-lactalbumin were the two principal proteins present in permeates from MF processing (FIG. 5), while some of the high molecular weight minor whey proteins also permeated the membrane during MF.

Figure 5:
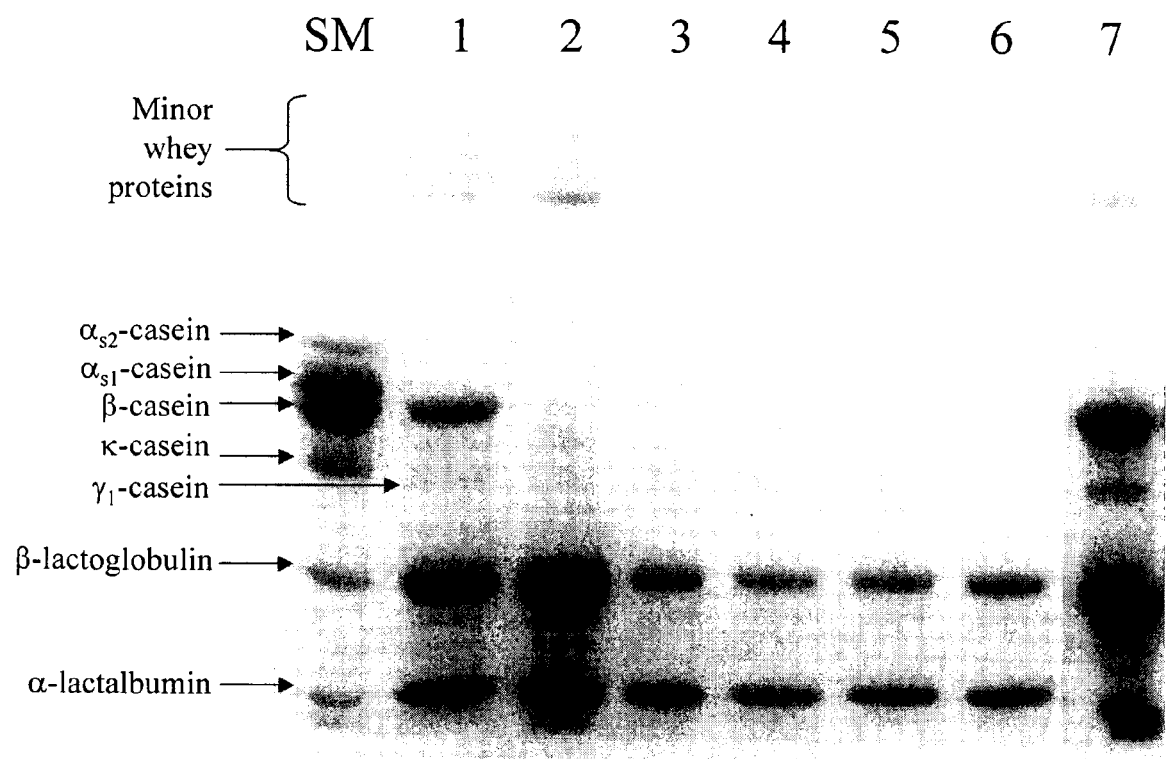
FIG. 5 is a sodium dodecyl sulphate-polyacrylamide gel electrophoretogram of skim milk (SM), demineralized composite permeate from the novel cold process (lane 1), MF permeate from 300 to 40 L concentration of demineralized composite permeate (lane 2), permeate from first (lane 3), second (lane 4), third (lane 5) and fourth (lane 6) diafiltration (DF) of demineralized composite permeate with 40 L of filtered water, and spray-dried retentate obtained after enriching the β-casein concentration of demineralized composite MF/DF permeate from the cold process (lane 7).
Figure 6:
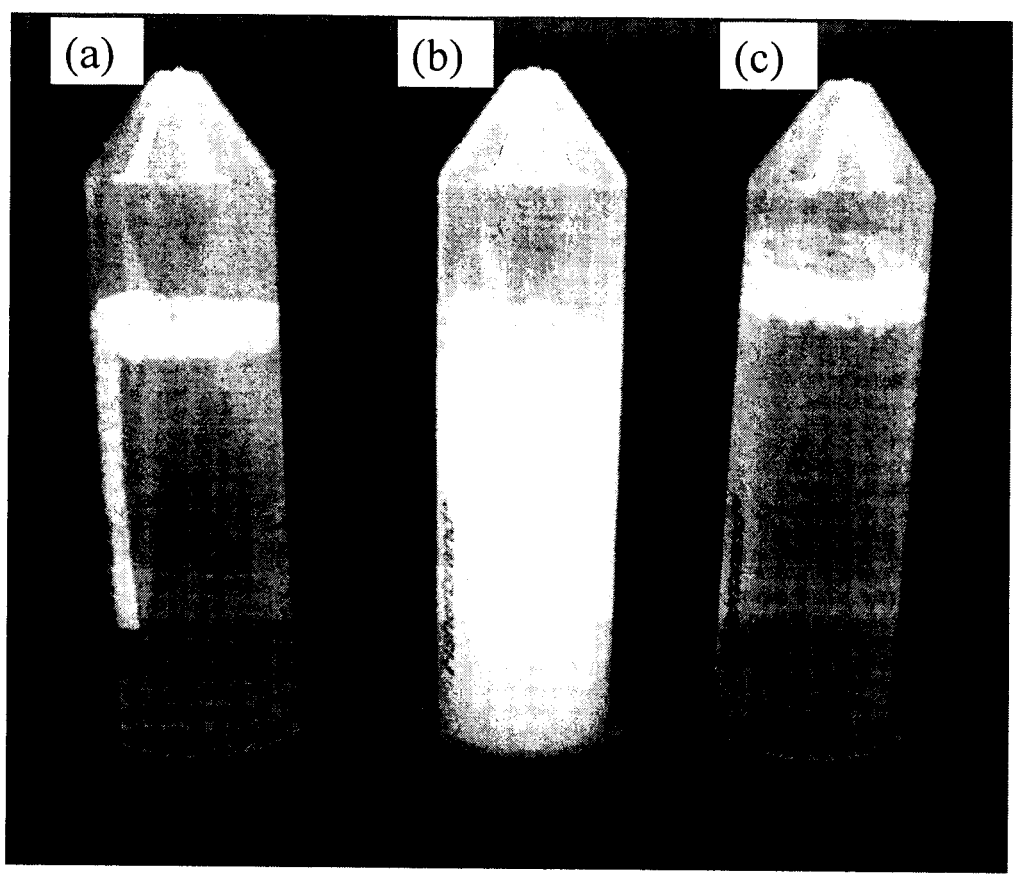
FIG. 6 shows the physical appearance of a sample of demineralized composite MF/DF permeate from the novel cold process at 2° C. (a), after heating to 26° C. at a rate of 0.1° C. min$^{-1}$ (b) and after re-cooling the heated sample back to 2° C. (c). Note almost complete solubility of the purified β-casein solution (permeate).

From the data in Table 5 and FIG. 5, it is clear that the efficiency of removal of whey proteins from the demineralized composite permeate was greater for the concentration step than any of the subsequent DF processing steps at 26° C. After MF processing at 26° C., the retentate had a total solids level of 1.85 g/100 g and a true protein content of 1.65 g/100 g, of which casein accounted for 40.1%. This equates to a 200% increase in the concentration of casein in the composite permeate, as casein represented just 21.2% of the true protein content of the composite permeate after demineralization. The aggregation and formation of micelles by β-casein in the demineralized composite permeate was completely reversed by reducing the temperature of the retentate obtained after enriching the β-casein concentration of the demineralized composite permeate to 2° C. (FIG. 6). The retentate was spray-dried to give a milk protein ingredient powder with a protein content of 87.5±1.59%.
Example: Demineralization of Composite Microfiltration/Diafiltration Permeate Prior to Spray-Drying The composite permeate was concentrated from 550 to 300 L by UF prior to demineralization. The chemical composition of the composite permeate before and after concentration and demineralization is given in Table 6. Removal of UF permeate by concentration reduced the ratio of calcium to casein in the composite permeate from 56.5 to 37.0%. Subsequent demineralization further reduced the concentration of calcium in the composite permeate from 40.7 to 9.34 mg/100 g. Accordingly, the ratio of calcium to casein in the composite permeate decreased from 37.0 to 11.7% as a result of demineralization. Due to the extensive removal of NPN from the composite permeate during demineralization, true protein represented over 94% of the crude protein content of the demineralized composite permeate as opposed to 68% before demineralization. The concentration of total solids in the concentrated composite permeate decreased from 6.18 to 0.83 g/100 g as a result of demineralization. After demineralization and further concentration by UF, the retentate had a total solids level of 2.65 g/100 g and a true protein content of 1.97 g/100 g, of which casein accounted for 28.5%. The retentate was spray-dried to give a milk protein ingredient powder with a protein content of 73.6±0.40%.
Properties of Cheese Made Using Milk Protein Concentrate Solutions with Different Ratios of $\alpha_{s1}$-casein and β-casein In one aspect of the invention, the obtained MPC powder, partially depleted of β-casein by low-temperature MF, is used for manufacturing of cheese with better functional properties, including increased meltability. A comparative example of the compositions of MPC powders used in the formulation of MPC solutions for cheesemaking is given in Table 4. A comparative example of the meltability of the corresponding manufactured cheeses is given in FIG. 7.

The ratio of $\alpha_{s1}$-:$\beta$-casein in milk influences its rennet coagulation properties. Hydrolysis of $\beta$-casein enhances the heat-induced functional properties, especially meltability, of cheese. Fat-free cheeses were manufactured from MPC solutions with identical concentrations of total casein (2.5%), but different $\alpha_{s1}$-:$\beta$-casein ratios. The MPC powder obtained from the warm filtration process had a $\alpha_{s1}$-:$\beta$-casein ratio of 1.00:1.08. The MPC powder obtained by the process of cold filtration (low-temperature MF), partially depleted of $\beta$-casein, had a $\alpha_{s1}$-:$\beta$-casein ratio of 1.00:1.00. After reconstitution of the MPC powders to 2.5% casein using deionized water, MPC solutions (20 kg) were used for cheesemaking using a 20 L mini-scale cheese vat. Chymosin (0.3 mL) (Rhodia Dairy Ingredients, Madison, Wis.) was added to the contents of the cheese vat. After coagulation for about 30 min, the coagulum was cut into cubes. The curd/whey mixture was cooked at 40° C. for 40 min with continuous stirring, before draining the whey. Curd was molded and pressed at 240 kPa overnight before being vacuum packaged and stored at 4° C. All cheeses were analyzed for composition, rheological and melt properties after three days.

The protein content of the cheeses was determined by the macro-Kjeldahl method (IDF, 1964). A University of Wisconsin Melt Profiler was used for melt profile analysis. A cylindrical sample (diameter 30 mm and height 7 mm) was taken from each cheese using an electric meat slicer, and analyzed. A thermocouple was inserted into the centre of the sample and the sample placed on the lower plate of the instrument in an oven at 72° C. During cheese melting, the height of cheese (i.e., distance between the plates) decreased. Change in height of cheese sample was measured at 3 s intervals over 15 min and expressed as a function of heating time. Meltability was determined by comparing the height of melted cheese to the initial height. Degree of flow was calculated as the change in height of the cheese sample at 60° C. in comparison to the height of the cheese at the start of the test.

The level of moisture, protein and pH in the cheese made using the MPC solution from the warm process was 51.2%, 41.4% and 5.45, respectively. The level of moisture, protein and pH in the cheese made using the novel MPC solution partially depleted of $\beta$-casein was 51.4%, 41.3% and 5.47, respectively. There were no significant (P>0.05) differences in moisture, protein or pH between the two cheeses.

Figure 7:
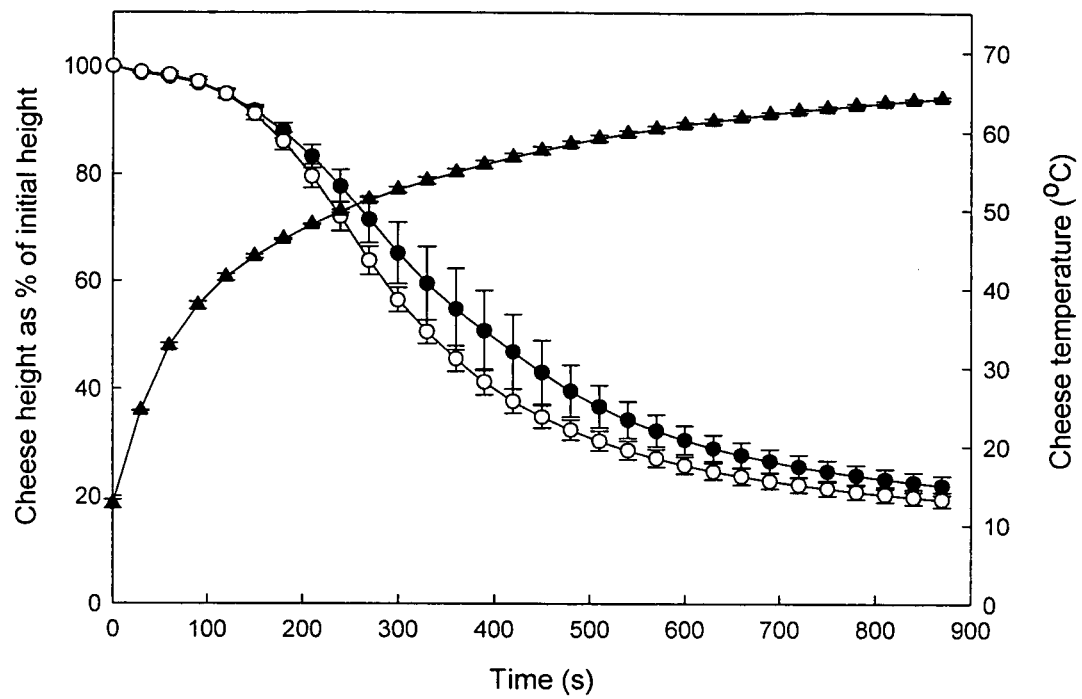
FIG. 7 shows melt profiles for directly-acidified model cheeses made using milk protein concentrate (MPC) solution obtained using a warm filtration process (●) or the milk protein concentrate solution obtained using a cold filtration process (○). Cheese temperature during melt profiles is also shown (▲). Testing was performed three days post manufacture. Data points are means of triplicate analyses, with error bars indicating ± one standard deviation. See Table 4 for composition of MPC powders.

The melt profiles of cheeses made using MPC solution from the warm process and MPC solution from the cold process (partially depleted of $\beta$-casein) are shown in FIG. 7. The temperature of each cheese sample increased from about 5-10° C. to about 64° C. over the 15 min heating period with the temperature profile being identical in all cheeses during heating. The height of the cheese samples decreased by about 65-75% during heating, with the rate of decrease being slightly more rapid for cheese made using MPC solution from the cold process than that made using MPC solution from the warm process. The degree of flow at 60° C. for cheese made using the MPC solution from the cold process, at 72.6±1.88%, was significantly (P<0.05) greater than that for cheese made using MPC solution from the warm process, at 67.8±1.42%.

Cheese made from MPC solution partially depleted of $\beta$-casein had lower values for firmness at 75% compression, storage modulus at 70° C. (index of elastic-like character) and greater values for maximum in loss tangent (index of melt/flow) than cheese with the normal ratio of $\alpha_{s1}$-:$\beta$-casein (i.e., that made using MPC solution from the warm process). The degree of flow, as measured by melt profile analysis of the cheeses (FIG. 7) increased significantly on depletion of $\beta$-casein. Therefore, partial depletion of $\beta$-casein (i.e., removing just 9-10% of total $\beta$-casein) strongly influenced the rheological and functional properties, especially meltability, of these model cheeses.

TABLE 5

Chemical composition of composite MF/DF permeate before and after concentration, demineralization and enrichment of the $\beta$-casein content

| Composition | Composite MF/DF permeate | UF permeate from 550 to 300 L concentration of composite permeate | Concentrated composite permeate before demineralisation | Concentrated composite permeate after demineralisation | MF permeate from 300 to 40 L concentration of composite permeate at 26° C. | Permeate from DF of concentrated demineralised permeate at 26° C. | Retentate after enriching $\beta$-casein content of demineralised composite MF/DF permeate |
|---|---|---|---|---|---|---|---|
| pH | 6.88 (0.05) | 6.87 (0.01) | 6.81 (0.00) | 7.62 (0.01) | 8.29 (0.02) | 8.22 (0.00) | 8.02 (0.02) |
| Total Solids (g/100 g) | 5.71 (0.02) | 5.20 (0.02) | 6.08 (0.02) | 0.59 (0.00) | 0.28 (0.01) | 0.13 (0.00) | 1.85 (0.01) |
| Ash (g/100 g) | 0.41 (0.03) | 0.48 (0.01) | 0.48 (0.01) | 0.07 (0.01) | 0.05 (0.02) | 0.04 (0.01) | 0.13 (0.03) |
| Calcium (mg/100 g) | 34.0 (2.92) | 31.4 (2.12) | 37.9 (2.34) | 8.42 (0.74) | 5.74 (0.81) | 4.64 (1.02) | 17.7 (2.19) |
| Lactose (g/100 g) | 4.90 (0.02) | 4.52 (0.02) | 5.07 (0.02) | 0.19 (0.00) | 0.17 (0.01) | 0.04 (0.00) | 0.07 (0.01) |
| Crude Protein (g/100 g) | 0.36 (0.01) | 0.17 (0.00) | 0.49 (0.02) | 0.33 (0.00) | 0.06 (0.00) | 0.05 (0.00) | 1.65 (0.00) |
| True Protein (g/100 g) | 0.18 (0.01) | 0.00 (0.00) | 0.38 (0.02) | 0.32 (0.00) | 0.06 (0.00) | 0.05 (0.00) | 1.65 (0.00) |
| Casein (g/100 g) | 0.06 (0.00) | —* | 0.09 (0.00) | 0.07 (0.00) | — | — | 0.66 (0.04) |
| Casein as % of crude protein | 16.0 (3.07) | — | 18.5 (0.65) | 20.3 (1.65) | — | — | 40.0 (2.25) |
| Casein as % of true protein | 27.9 (6.49) | — | 23.7 (1.07) | 21.2 (1.72) | — | — | 40.1 (2.26) |
| Ratio of calcium to crude protein (%) | 9.33 (0.98) | — | 7.82 (0.48) | 2.55 (0.23) | — | — | 12.6 (1.11) |
| Ratio of calcium to casein (%) | 56.5 (8.13) | — | 42.1 (2.59) | 10.7 (0.13) | — | — | 2.68 (0.33) |

Numbers represent means and standard deviations, with the latter in parentheses (n = 3).
*parameter not measured.

TABLE 6

Chemical composition of composite MF/DF permeate before and after concentration and demineralization

| Composition | Composite MF/DF Permeate | UF permeate from 550 to 300 L concentration of composite permeate | Concentrated composite permeate before demineralisation | Concentrated composite permeate after demineralisation | Retentate after demineralisation and further concentration of composite permeate |
|---|---|---|---|---|---|
| pH | 6.88 (0.05) | 6.82 (0.00) | 6.79 (0.01) | 7.49 (0.02) | 7.41 (0.01) |
| Total Solids (g/100 g) | 5.71 (0.02) | 5.28 (0.05) | 6.18 (0.00) | 0.83 (0.01) | 2.65 (0.00) |
| Ash (g/100 g) | 0.41 (0.03) | 0.42 (0.03) | 0.46 (0.01) | 0.08 (0.01) | 0.14 (0.00) |
| Calcium (mg/100 g) | 34.0 (2.92) | 32.4 (3.61) | 40.7 (2.28) | 9.34 (0.25) | 23.0 (0.24) |
| Lactose (g/100 g) | 4.90 (0.02) | 4.66 (0.05) | 5.12 (0.00) | 0.40 (0.01) | 0.48 (0.00) |
| Crude Protein (g/100 g) | 0.36 (0.01) | 0.17 (0.00) | 0.56 (0.01) | 0.34 (0.00) | 2.00 (0.00) |
| True Protein (g/100 g) | 0.18 (0.01) | 0.00 (0.00) | 0.38 (0.01) | 0.32 (0.00) | 1.97 (0.00) |
| Casein (g/100 g) | 0.06 (0.00) | —* | 0.11 (0.00) | 0.08 (0.00) | 0.56 (0.01) |
| Casein as % of crude protein | 16.0 (3.07) | — | 19.4 (0.09) | 22.8 (0.56) | 27.9 (0.43) |
| Casein as % of true protein | 27.9 (6.49) | — | 28.5 (0.14) | 24.2 (0.60) | 28.5 (0.43) |
| Ratio of calcium to crude protein (%) | 9.33 (0.98) | — | 7.26 (0.41) | 2.75 (0.07) | 1.15 (0.01) |
| Ratio of calcium to casein (%) | 56.5 (8.13) | — | 37.0 (2.08) | 11.7 (0.31) | 4.11 (0.03) |

Numbers represent mean and standard deviation, with the latter in parentheses (n = 3).
*parameter not measured β-Casein has a strong propensity to associate with itself and other caseins at high temperatures via hydrophobic interactions. Reducing the concentration of β-casein would be expected to reduce the number of hydrophobic interactions and may increase melt and flow of cheese. Although not wishing to be bound by any particular theory regarding the mechanisms of the invention, it is possible that increased meltability of cheese made using MPC solution partially depleted of β-casein may be due to increased conformational flexibility of casein molecules within β-casein depleted micelles.

Purity and Properties of the Obtained β-casein

The obtained β-casein is highly water soluble and makes a clear solution which is useful for its functionality, e.g., has superior foaming properties. For clarity measurement, absorbance measurements at 700 nm were performed. The absorbance of milk is approx 2.5 (arbitrary units), the absorbance 1% solution of beta-casein is between 0.2-0.4 (arbitrary units), the absorbance of 1% sodium caseinate was between 0.13-0.4 (arbitrary units).

The beta-casein solution was slightly more translucent than sodium caseinate when measured at room temperature but it was not opaque like milk. This translucency could be improved easily by more demineralization or by using lower temperatures for absorbance measurement.

Comparative foaming tests were performed, using the methods described by Phillips, L. G. et al., 1990, *J. Food Sci.* 55: 1441-1444, 1453. Shown in Table 7 are comparative foaming data for solutions containing different concentrations of sodium caseinate and of β-casein. Even at half the concentration as the sodium caseinate, the β-casein material produced more foam overrun and this foam was more stable than the solution containing sodium caseinate.

The data demonstrate that the obtained β-casein can be used to replace or substitute sodium caseinate in various applications, including food and food processing.

TABLE 7

Foaming and foam stability tests

| Sample | Source | % solution | Wt of 118 ml Foam (g) | % Overrun | Funnel Foam Wt (g) | Time to 50% Drain Wt min | sec |
|---|---|---|---|---|---|---|---|
| Sodium Caseinate | Main St Ingred. | 5.0 | 9.96 | 91.50 | 9.13 | 16 | 31 |
| Beta-casein | | 2.5 | 5.92 | 94.98 | 5.22 | 37 | 41 |
| Sodium Caseinate | Century | 5.0 | 8.17 | 93.08 | | 28 | 51 |
| Calcium Caseinate | Century | 5.0 | 7.93 | 93.27 | | 37 | 32 |
| Beta-casein* | | 2.5 | 4.98 | 95.80 | 4.80 | 41 | 42 |

*Repeat of the experiment using the above beta-casein sample.

The invention having been fully described, it is preferably apparent to one skilled in the art that changes and modifications can be made thereto without departing from the spirit and scope thereof.

What is claimed is:

1. A method for obtaining β-casein comprising the steps of:
   a) cooling first milk to a temperature of about 1-6° C. to release β-casein from the micelles containing β-casein;
   b) using microfiltration to form a first β-casein-enriched permeate and a first β-casein-depleted retentate;
   c) separating second milk using first ultrafiltration to obtain first ultrafiltered permeate;
   d) combining the first β-casein-depleted retentate with the first ultrafiltered permeate to form a mixture;
   e) cooling the mixture to a temperature of about 1-6° C. to release β-casein from the micelles containing β-casein;
   f) separating the mixture using first microfiltration/diafiltration to obtain a second β-casein-enriched permeate;

g) combining the first β-casein-enriched permeate and the second β-casein-enriched permeate into a composite permeate fraction;
h) cooling the composite permeate fraction;
i) separating the cooled composite permeate fraction using ultrafiltration/diafiltration to obtain concentrated and demineralized fraction enriched in β-casein;
j) increasing the temperature of the concentrated and demineralized fraction enriched in β-casein to facilitate formation of micelles containing β-casein; and
k) separating β-casein from the concentrated and demineralized fraction using second microfiltration/diafiltration.

2. The method of claim 1 wherein the temperature of the concentrated and demineralized fraction enriched in β-casein is increased to less than about 30° C.

3. A method for obtaining β-casein from milk comprising the steps of:
a) cooling milk to a temperature of about 1 to about 6° C. to release β-casein from the micelles containing β-casein;
b) using a polymeric microfiltration membrane to form a permeate enriched in β-casein;
c) demineralizing the permeate enriched in β-casein; and
d) further enriching said demineralized permeate enriched in β-casein using reversible thermal-induced aggregation.

4. The method of claim 3, wherein the cooling is conducted for about 24 to about 48 hours.

5. The method of claim 3, wherein the microfiltration membrane comprises polyvinylidine fluoride.

6. The method of claim 3, wherein the microfiltration membrane has a pore size of about 0.2 μm to about 2.0 μm.

7. The method of claim 3, wherein the microfiltration membrane has a pore size of about 0.5 μm.

8. The method of claim 3, wherein the microfiltration membrane is spiral-wound.

9. The method of claim 3, wherein the permeate comprises at least 90% β-casein.

* * * * *